United States Patent
Lee et al.

(10) Patent No.: US 9,946,005 B2
(45) Date of Patent: Apr. 17, 2018

(54) METHOD OF MANUFACTURING LIQUID CRYSTAL DISPLAY DEVICE

(71) Applicant: SAMSUNG DISPLAY CO., LTD., Yongin-si, Gyeonggi-do (KR)

(72) Inventors: Baek Hee Lee, Yongin-si (KR); Hae Il Park, Yongin-si (KR); Mun Ki Sim, Yongin-si (KR); Seon-Tae Yoon, Yongin-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 15/446,964

(22) Filed: Mar. 1, 2017

(65) Prior Publication Data

US 2017/0176662 A1    Jun. 22, 2017

Related U.S. Application Data

(62) Division of application No. 14/609,671, filed on Jan. 30, 2015, now abandoned.

(30) Foreign Application Priority Data

Sep. 3, 2014 (KR) ........................ 10-2014-0117245

(51) Int. Cl.
*G02F 1/1335* (2006.01)
*F21V 8/00* (2006.01)
(Continued)

(52) U.S. Cl.
CPC ........ *G02B 6/0026* (2013.01); *B29C 35/0805* (2013.01); *B29C 70/745* (2013.01);
(Continued)

(58) Field of Classification Search
None
See application file for complete search history.

(56) References Cited

U.S. PATENT DOCUMENTS

2011/0309325 A1    12/2011  Park et al.
2012/0113671 A1    5/2012   Sadasivan et al.
(Continued)

FOREIGN PATENT DOCUMENTS

KR    10-2011-0133398 A    12/2011
KR    10-2011-0136069 A    12/2011
(Continued)

OTHER PUBLICATIONS

NANOSYS™—Quantum Dot Pioneers, "Welcome to a Revolution in Color", www.nanosysinc.com, Oct. 31, 2014, 1:42:52 pm.
(Continued)

*Primary Examiner* — Richard Kim
(74) *Attorney, Agent, or Firm* — Lee & Morse, P.C.

(57) ABSTRACT

A liquid crystal display device, includes a display panel; a light guide plate to transfer light to the display panel; and a light source module on a side surface of the light guide plate to supply light to the light guide plate, the light source module including a light source to generate light; and a quantum dot unit between the light source and the light guide plate, the quantum dot unit extending along the side surface of the light guide plate and including a tube member filled with a resin including quantum dots, the tube member including a sealing part.

16 Claims, 13 Drawing Sheets

(51) Int. Cl.
  *G02F 1/1341* (2006.01)
  *G02F 1/1334* (2006.01)
  *G02F 1/1339* (2006.01)
  *B29C 70/74* (2006.01)
  *B29C 35/08* (2006.01)
  *B29L 31/34* (2006.01)
  *B29K 105/16* (2006.01)

(52) U.S. Cl.
  CPC .......... *G02F 1/1334* (2013.01); *G02F 1/1339* (2013.01); *G02F 1/1341* (2013.01); *G02F 1/133621* (2013.01); *B29C 2035/0827* (2013.01); *B29K 2105/162* (2013.01); *B29K 2995/0036* (2013.01); *B29L 2031/3475* (2013.01); *G02F 2001/133614* (2013.01); *G02F 2202/36* (2013.01); *G02F 2203/05* (2013.01)

(56) References Cited

U.S. PATENT DOCUMENTS

| | | |
|---|---|---|
| 2012/0113672 A1 | 5/2012 | Dubrow et al. |
| 2013/0148376 A1 | 6/2013 | Nick et al. |
| 2013/0271700 A1 | 10/2013 | Nakamura et al. |
| 2015/0049491 A1* | 2/2015 | Venkataraman ........ H01L 33/00 362/318 |
| 2015/0355400 A1 | 12/2015 | Li et al. |

FOREIGN PATENT DOCUMENTS

| | | |
|---|---|---|
| KR | 10-2011-0136676 A | 12/2011 |
| KR | 10-2012-0105953 A | 9/2012 |
| KR | 10-2012-0122654 A | 11/2012 |

OTHER PUBLICATIONS

Allsee, 55" LCD Video Wall Display Super Narrow Bezel—TL55H2, www.allsee-tech.com/led-video-wall-display/55-inch-video-wall-display-super-narrow-bezel.html#page=page-1, Oct. 31, 2014, 1:41:33 pm.

* cited by examiner

METHOD OF MANUFACTURING LIQUID CRYSTAL DISPLAY DEVICE

CROSS-REFERENCE TO RELATED APPLICATIONS

This is a divisional application based on pending application Ser. No. 14/609,671, filed Jan. 30, 2015, the entire contents of which is hereby incorporated by reference.

Korean Patent Application No. 10-2014-0117245, filed on Sep. 3, 2014, in the Korean Intellectual Property Office, and entitled: "Liquid Crystal Display Device and Manufacturing Method Thereof," is incorporated by reference herein in its entirety.

BACKGROUND

1. Field

Embodiments relate to a liquid crystal display device and a manufacturing method thereof, for example, to a liquid crystal display device and a manufacturing method thereof, using quantum dots.

2. Description of the Related Art

A liquid crystal display device is a passive device, which does not emit light by itself, and may be classified into a liquid crystal display panel that displays on a screen and a backlight device that supplies light to the liquid crystal display panel. The backlight device may include a light source that emits light. As the light source, a cold cathode fluorescent lamp (CCFL), an external electrode fluorescent lamp (EEFL), or a light emitting diode (LED), for example, may be used.

SUMMARY

Embodiments may be realized by providing a liquid crystal display device, including a display panel; a light guide plate to transfer light to the display panel; and a light source module on a side surface of the light guide plate to supply light to the light guide plate, the light source module including a light source to generate light; and a quantum dot unit between the light source and the light guide plate, the quantum dot unit extending along the side surface of the light guide plate and including a tube member filled with a resin including quantum dots, the tube member including a sealing part.

The light source may include a plurality of blue light emitting diodes on the side surface of the light guide plate.

The tube member may include a light transmissive material.

The sealing part may be a sealing neck that is sealed by heat, and a diameter of the sealing neck may be smaller than a diameter of the tube member.

The sealing neck may have an internal diameter that is larger than an external diameter of an injection needle for injecting the resin.

A shape of a cross-section of the sealing neck may be one of a rectangle, a square, an oval, or a circle.

A shape of a cross-section of the tube member may be one of a rectangle, a square, an oval, or a circle.

Embodiments may be realized by providing a method of manufacturing a liquid crystal display device including a display panel, a light source to supply light to the display panel, and quantum dots unit on a light-emitting surface of the light source, the method including disposing a tube member having one open end; injecting a resin including quantum dots into the tube member through the open end; and sealing the tube member by locally heating the open end.

The open end may be a sealing neck having an external diameter that is smaller than an external diameter of a remaining portion of the tube member.

Injecting the resin including quantum dots into the tube member through the open end may include inserting an injection needle for injecting the resin through the open end and injecting the resin into the tube member through the injection needle.

The open end may have an internal diameter that is larger than an external diameter of the injection needle.

The resin may fill the tube member up to a beginning of the open end.

The method may further include removing the injection needle after the resin fills the tube member to the beginning of the open end.

The method may further include adjusting an inside of the tube member into which the resin is injected to a vacuum condition.

The method may further include purging an inside of the tube member into which the resin is injected using an inert gas.

The method may further include curing the resin after the inside of the tube member into which the resin is injected is adjusted to a vacuum condition or purged with an inert gas.

The method may include curing the resin by one or more of ultraviolet curing or heat curing.

Sealing the tube member by locally heating the open end may include locally cooling a beginning of the open end of the tube member, which is filled with the resin.

Disposing the tube member having one open end may include forming the tube member to have a cross-section of which shape is one of a rectangle, a square, an oval, or a circle.

Disposing the tube member having one open end may include forming the open end to have a cross-section of which shape is one of a rectangle, a square, an oval, or a circle.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In addition, in various exemplary embodiments, the same constituent elements are denoted by the same reference numerals and are representatively described in an exemplary embodiment, and different elements from the elements of the exemplary embodiment are described in other exemplary embodiments.

In the drawings and this specification, parts or elements that are not related to the description hereof are omitted in order to clearly describe exemplary embodiments, and the same or like constituent elements are designated by the same reference numerals throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements. In the drawings, the dimensions, e.g., thickness, of layers, films, panels, regions, etc., may be exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

Figure 1:
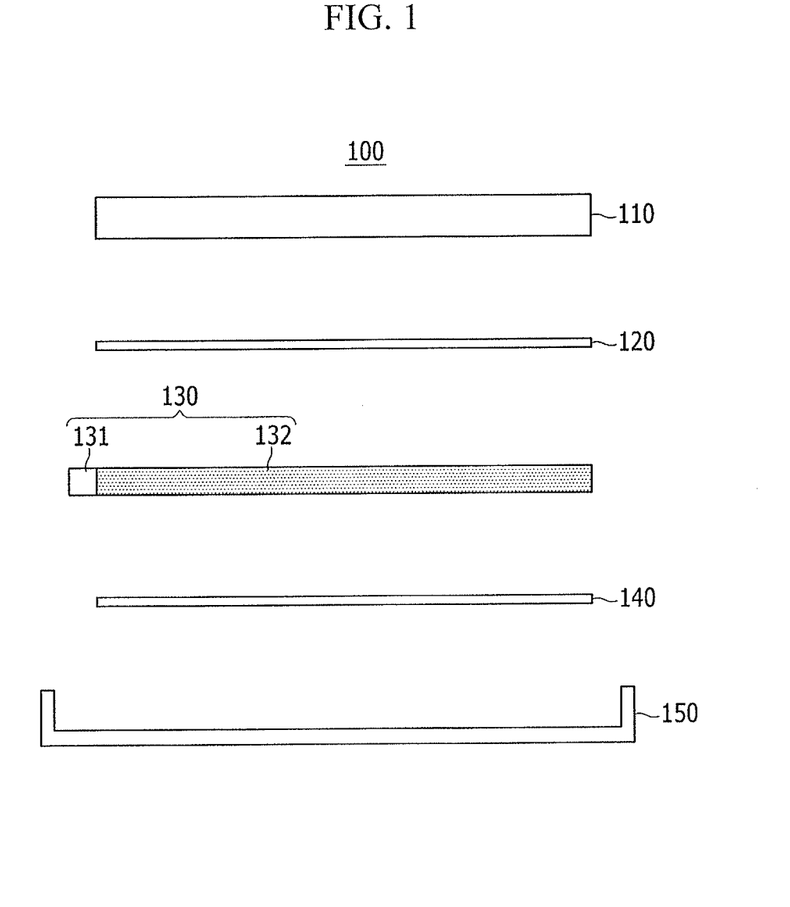
FIG. 1 illustrates an exploded side view of a liquid crystal display device according to an exemplary embodiment.

FIG. 1 illustrates an exploded side view of a liquid crystal display device according to an exemplary embodiment. Referring to FIG. 1, the liquid crystal display device 100 may include a display panel 110, a diffuser sheet 120 disposed below the display panel 110, a backlight unit 130 disposed below the diffuser sheet 120 to supply light to the display panel 110, a reflective sheet 140 disposed below the backlight unit 130 to reflect the light supplied from the backlight unit 130, and a frame 150 disposed below the reflective sheet 140 to support the display panel 110, the diffuser sheet 120, the backlight unit 130, and the reflective sheet 140.

The display panel 110 may include a thin film transistor array panel (not shown), a common electrode panel (not shown) disposed to be opposite thereto, and a liquid crystal layer (not shown) interposed therebetween. The thin film transistor array panel may include a thin film transistor and a pixel electrode connected thereto. The common electrode panel may include a common electrode that is disposed to be opposite to the pixel electrode. The thin film transistor array panel and the common electrode panel and the display panel 110 including the same may be configured variously, and detailed descriptions thereof will be omitted.

The diffuser sheet 120 may serve to diffuse the light supplied from the backlight unit 130, and uniform brightness over the entire display panel 110 may be accomplished.

The backlight unit 130 may include a light source module 131 and a light guide plate 132. The light source module 131 may be disposed at a side surface of the light guide plate 132, and may supply light to the light guide plate 132. The light guide plate 132 may be made of a transparent material, and may transmit the light supplied from the light source module 131. The light guide plate 132 may include a pattern such as protrusions or grooves, and may reflect or refract the light supplied from the light source module 131 to be transferred to an upper side of the light guide plate 132, i.e., the display panel 110.

Light may be transferred to a lower side of the light guide plate 132, and the reflective sheet 140 may serve to reflect the light transferred from the lower side of the light guide plate 132 to the upper side of the light guide plate 132.

Hereinafter, the backlight unit 130 will be described with reference to FIG. 2 and FIG. 3.

Figure 2:
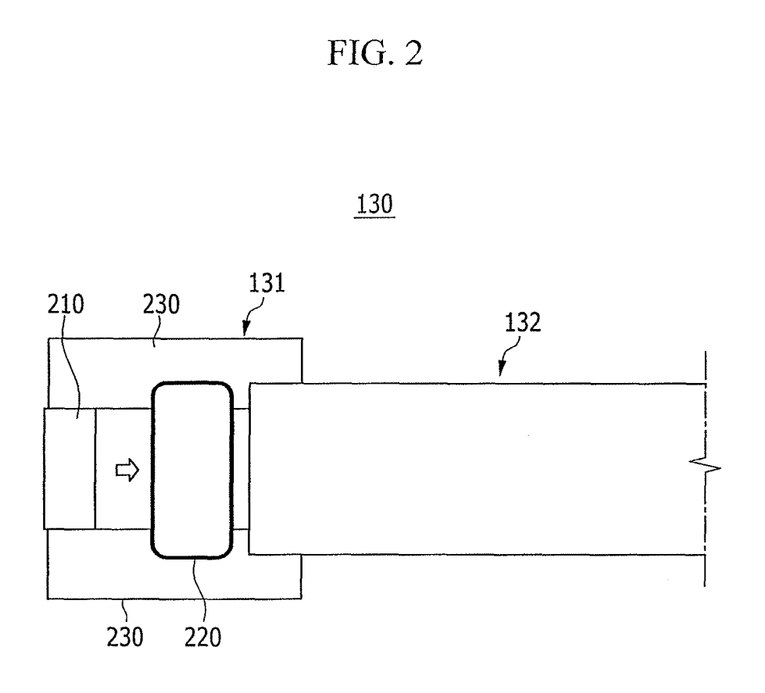
FIG. 2 illustrates a side view of a backlight unit according to an exemplary embodiment.
Figure 3:
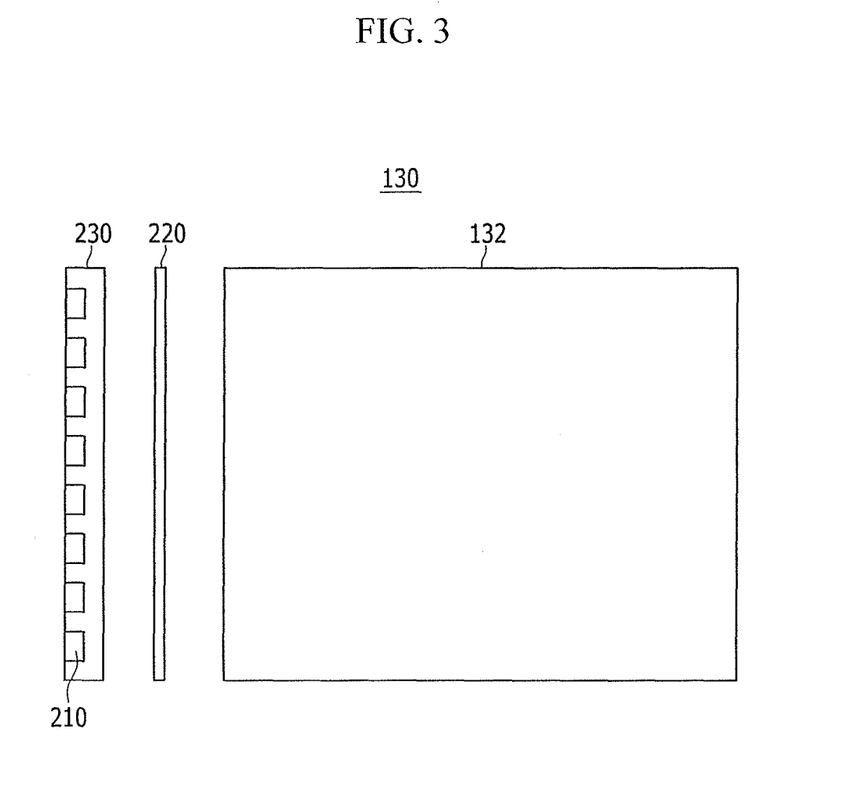
FIG. 3 illustrates an exploded top plan view of a backlight unit according to an exemplary embodiment.

FIG. 2 illustrates a side view of a backlight unit according to an exemplary embodiment. FIG. 3 illustrates an exploded top plan view of a backlight unit according to an exemplary embodiment. Referring to FIG. 2 and FIG. 3, the light source module 131 may include a light source 210, a quantum dot unit 220 disposed between the light source 210 and the light guide plate 132, and a supporter 230 configured to securely support the light source 210 and the quantum dot unit 220.

The light source 210 may be a fluorescent light source such as a cold cathode fluorescent lamp (CCFL) or a light emitting diode (LED). For example, the light source 210 may be a blue LED. The light source 210 may generate light having a wavelength of an ultraviolet rays-visible ray region. The light source 210 may include a plurality of light sources 210 that are disposed at a side surface of the light guide plate 132. For example, the light source 210 may include a plurality of blue LEDs that are disposed at the side surface of the light guide plate 132.

The quantum dot unit 220 may be disposed between the light source 210 and the light guide plate 132, may extend along the side surface of the light guide plate 132, and may be disposed on a light emitting surface of the light source 210. The quantum dot unit 220 may be filled with quantum dots as fluorescent materials, and may convert light introduced from the light source 210 into strong light having a narrow wavelength to be transferred to the light guide plate 132. The quantum dots may emit light of a visible ray region.

The quantum dots may be particles having cores formed of nano-sized Group II-IV semiconductor compounds (e.g., CdSe, CdTe, and CdS). The fluorescence of quantum dots may be caused by light generated when electrons that are excited drop from a conduction band to a valence band. The cores of the quantum dots may be formed of the same materials, and the fluorescence wavelengths of the quantum dots may become different according to the sizes of the particles. The quantum dots may have smaller particles, and the quantum dots may emit fluorescence of shorter wavelengths. The size of the quantum dots may be adjusted, and it may be possible to emit fluorescence of a visible ray region of a desired wavelength. Excitation wavelength may be arbitrarily selected, and fluorescence may be obtained. Various quantum dots may co-exist with one wavelength, and it may be possible to observe various colors of fluorescence at once. As compared with typical dyes, the quantum dots may have extinction coefficients that are larger by 100 to 1000 times and high quantum yields, and the quantum dots emit very strong fluorescence. A transition band from a ground vibration state of the conduction band to a ground vibration state of a valance band may be exclusively observed, and the fluorescence wavelength may be almost monochromatic light.

It may be possible to improve the color reproducibility of the liquid crystal display device 100 by 100% or greater using the quantum dot unit 220 filled with quantum dots.

The supporter 230 may include a receiving groove for securely supporting the light source 210 and the quantum dot unit 220. The supporter 230 may be coupled to one side surface of the light guide plate 132.

A configuration and a manufacturing process of the quantum dot unit 220 will be described in detail with reference to FIG. 4 to FIG. 9.

Figure 4:
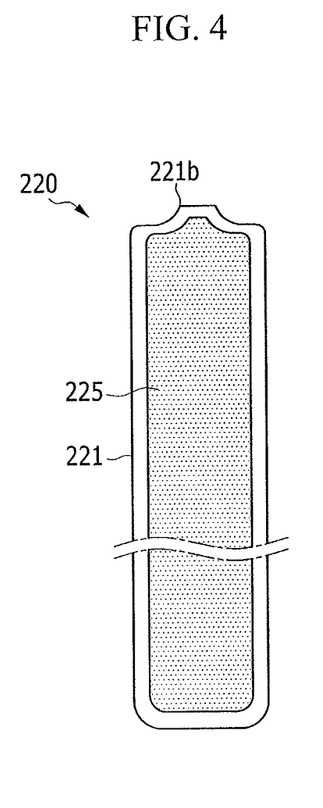
FIG. 4 illustrates a top plan view of a quantum dot unit according to an exemplary embodiment.

FIG. 4 illustrates a top plan view of a quantum dot unit according to an exemplary embodiment. Referring to FIG. 4, the quantum dot unit 220 may include a tube member 221 and a resin 225 that fills the tube member 221.

The tube member 221 may be made of a light transmissive material. The tube member 221 may include a sealing part 221b. The sealing part may have a neck-shaped open end that is sealed air-tight.

The resin 225 that fills the tube member 221 may include quantum dots. The resin 225 including the quantum dots may be a polymer material that may be solidified by ultraviolet (UV) curing or heat curing.

Figure 5:
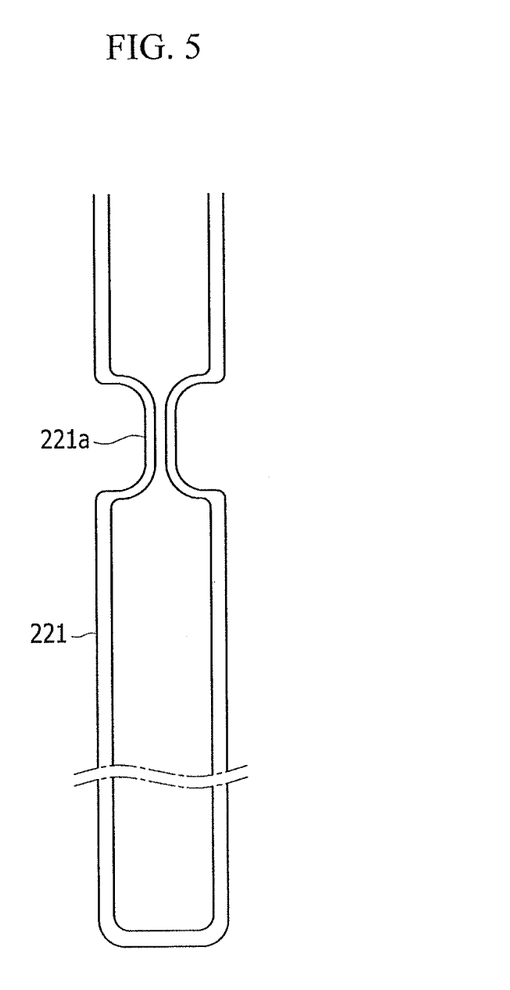
FIG. 5 to FIG. 9 illustrate a manufacturing method of a quantum dot unit according to an exemplary embodiment.

FIG. 5 to FIG. 9 illustrate a manufacturing method of a quantum dot unit according to an exemplary embodiment. Referring to FIG. 5, a sealing neck 221a may be formed at one end of a tube member 221 having one end that is open. The sealing neck 221a may be formed at a portion at which the sealing part 221b is to be formed after the tube member 221 is filled with the resin 225 including the quantum dots. The external diameter of the sealing neck 221a may be smaller than that of a remaining portion of the tube member 221. The diameter of the sealing neck 221a may be relatively smaller than of the tube member 221, and the sealing neck 221a may be sealed by heating a narrow region thereof at a relative low temperature.

Figure 6:
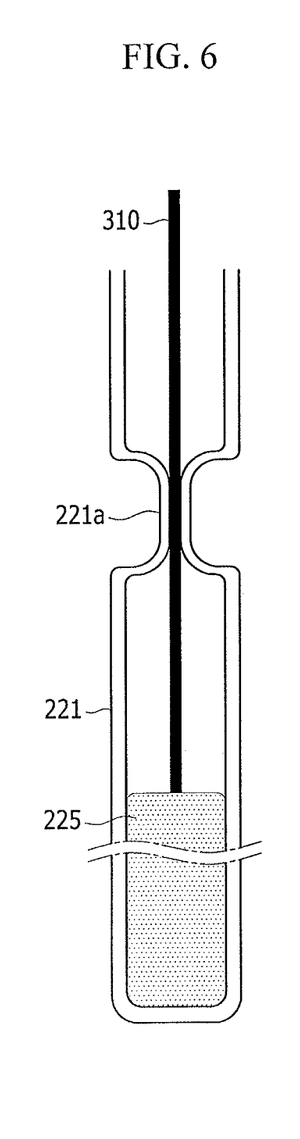

Referring to FIG. 6, an injection needle 310 may be used for injecting the resin 225 through the sealing neck 221a of the tube member 221, and the resin 225 may fill the tube member 221 using the injection needle 310. For example, the internal diameter of the sealing neck 221a may be larger than the external diameter of the injection needle 310. The resin 225 may be filled up to the proximity, e.g., beginning, of the sealing neck 221a of the tube member 221. The injection needle 310 may be removed after the resin 225 is filled up to the proximity e.g., beginning, of the sealing neck 221a of the tube member 221.

Figure 7:
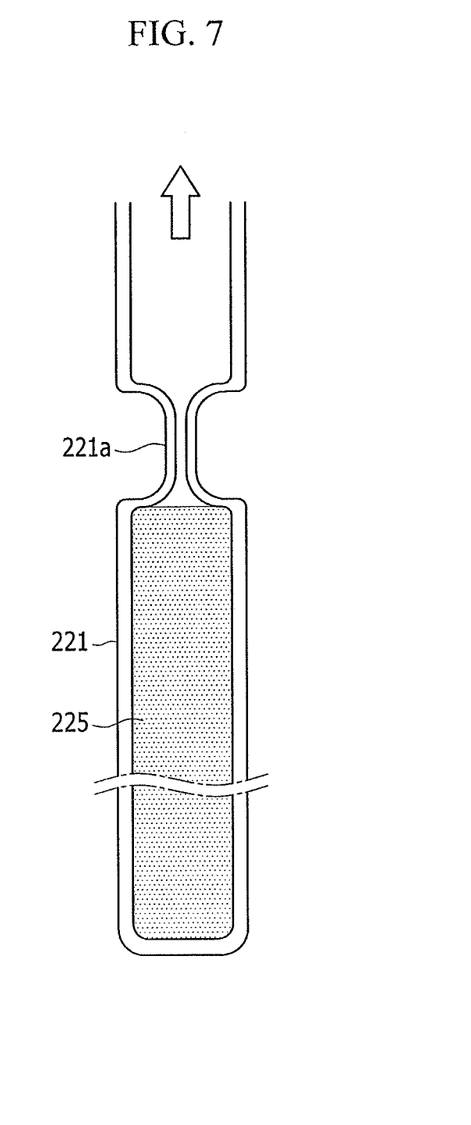

Referring to FIG. 7, the resin 225 filling the tube member 221 may be in a liquid state, and may be subjected to a curing process to cure the liquid resin 225. In the curing process, an inside of the tube member 221 may be subjected to vacuum conditions. In an embodiment, the inside of the tube member 221 may be purged using an inert gas such as nitrogen gas or argon gas. The purging may reduce the concentration of oxygen gas or hydrocarbon gas. In an embodiment, the inside of the tube member 221 may be subjected to vacuum conditions after the inside of the tube member 221 is purged.

Figure 8:
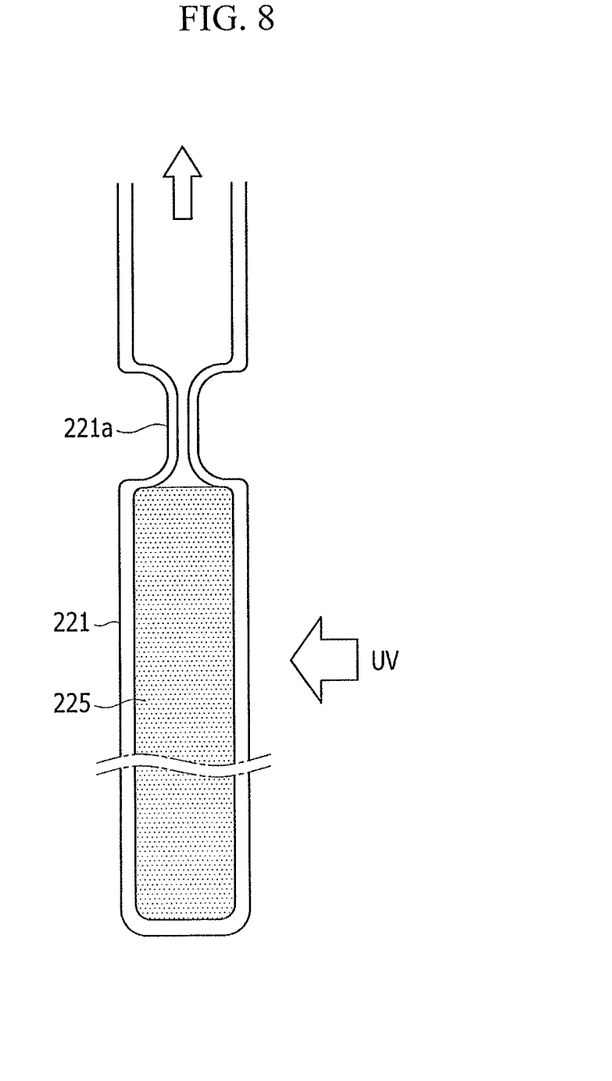

Referring to FIG. 8, the resin 225 may be subjected to the UV curing after the inside of the tube member 221 is subjected to vacuum conditions or purged with an inert gas. The resin 225 filling the tube member 221 may be solidified by the UV curing. FIG. 8 illustrates the resin 225 being subjected to UV curing. In an embodiment, the resin 225 may be subjected to heat curing.

Figure 9:
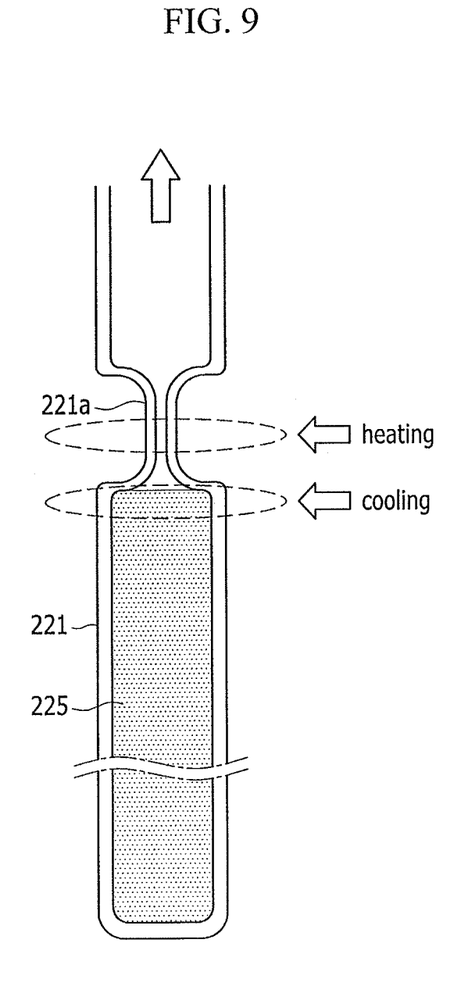

Referring to FIG. 9, the tube member 221 may be sealed by locally heating the sealing neck 221a after the resin 225 filling the tube member 221 is cured. The heating temperature of the sealing neck 221a may be equal to or higher than a glass transition temperature of the sealing neck 221a, and damage of the quantum dots included in the resin 225 caused by heat applied to the sealing neck 221a may be minimized by locally cooling the proximity e.g., beginning, of the sealing neck 221a of the tube member 221, which is filled with the resin 225.

A heating and cooling device for sealing the tube member 221 may employ a wire-heating and wire-cooling method. For example, the tube member 221 may be locally heated by winding a heating wire around the sealing neck 221a, and may be cooled by winding a cooling wire around the proximity, e.g., beginning, of the sealing neck 221a. In an embodiment, a water cooling type or an air cooling type may be applied instead of the wire cooling type.

The tube member 221 may be sealed by locally heating the sealing neck 221a, and the quantum dot unit 220 shown in FIG. 4 may be manufactured.

As described above, the quantum dot unit 220 may be manufactured using the tube member 221 formed with the sealing neck 221a, unnecessary protrusions may be minimized, and the width of the bezel of the liquid crystal display device 100 may be reduced.

The cross-section of the quantum dot unit 220 may have a rectangular shape. In embodiments, the quantum dot unit 220 may be formed to have a cross-section of various shapes such as, for example, a square, an oval, or a circle. Further, the sealing neck 221a of the quantum dot unit 220 may be formed to have a cross-section of various shapes such as a rectangle, a square, an oval, or a circle.

Figure 10:
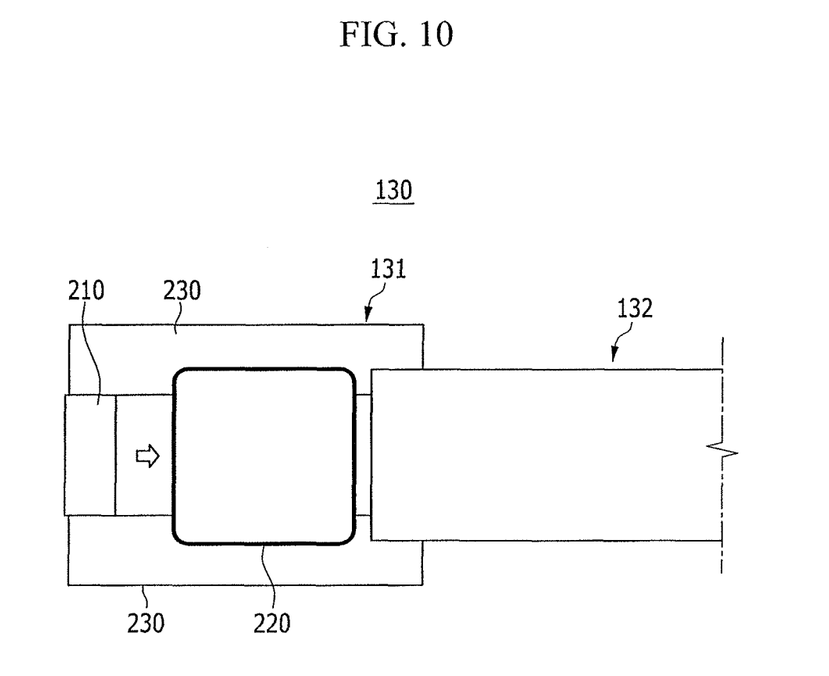
FIG. 10 illustrates a side view of a backlight unit according to an exemplary embodiment.

FIG. 10 illustrates a side view of a backlight unit according to an exemplary embodiment. Referring to FIG. 10, the cross-section of the quantum dot unit 220 may have a square shape, the tube member 221 may be formed to have a square-shaped cross-section, and the sealing neck 221a of the tube member 221 may be formed to have a square-shaped cross-section. In an embodiment, the sealing neck 221a of the tube member 221 may be formed to have a cross-section of various shapes such as a rectangle, an oval, or a circle. The other elements may be the same as those of FIG. 2 and FIG. 3, and detailed descriptions thereof will be omitted.

Figure 11:
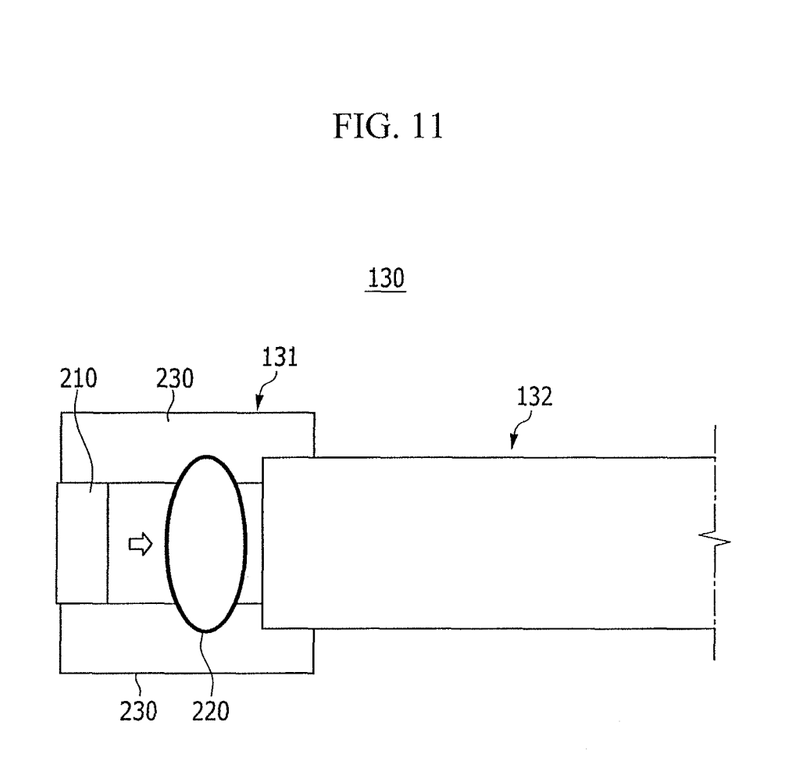
FIG. 11 illustrates a side view of a backlight unit according to an exemplary embodiment.

FIG. 11 illustrates a side view of a backlight unit according to an exemplary embodiment. Referring to FIG. 11, the cross-section of the quantum dot unit 220 may have an oval shape, the tube member 221 may be formed to have an oval-shaped cross-section, and the cross-section of the sealing neck 221a of the tube member 221 may have an oval shape. In an embodiment, the cross-section of the sealing neck 221a of the tube member 221 may have various shapes such as a rectangle, a square, or a circle. The other elements may be the same as those of FIG. 2 and FIG. 3, and detailed descriptions thereof will be omitted.

Figure 12:
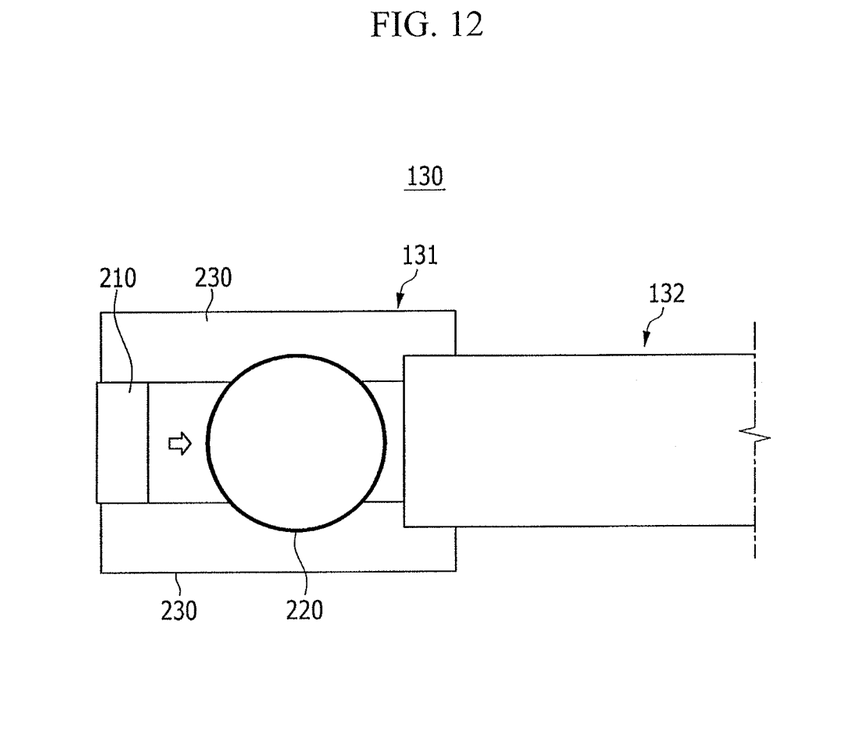
FIG. 12 illustrates a side view of a backlight unit according to an exemplary embodiment.

FIG. 12 illustrates a side view of a backlight unit according to an exemplary embodiment. Referring to FIG. 12, the cross-section of the quantum dot unit 220 may have a circular shape, the tube member 221 may be formed to have a circular-shaped cross-section, and the sealing neck 221a of the tube member 221 may be formed to have a circular-shaped cross-section. In an embodiment, the sealing neck 221a of the tube member 221 may be formed to have a cross-section of various shapes such as a rectangle, a square, and an oval. The other elements may be the same as those of FIG. 2 and FIG. 3, and detailed descriptions thereof will be omitted.

Figure 13:
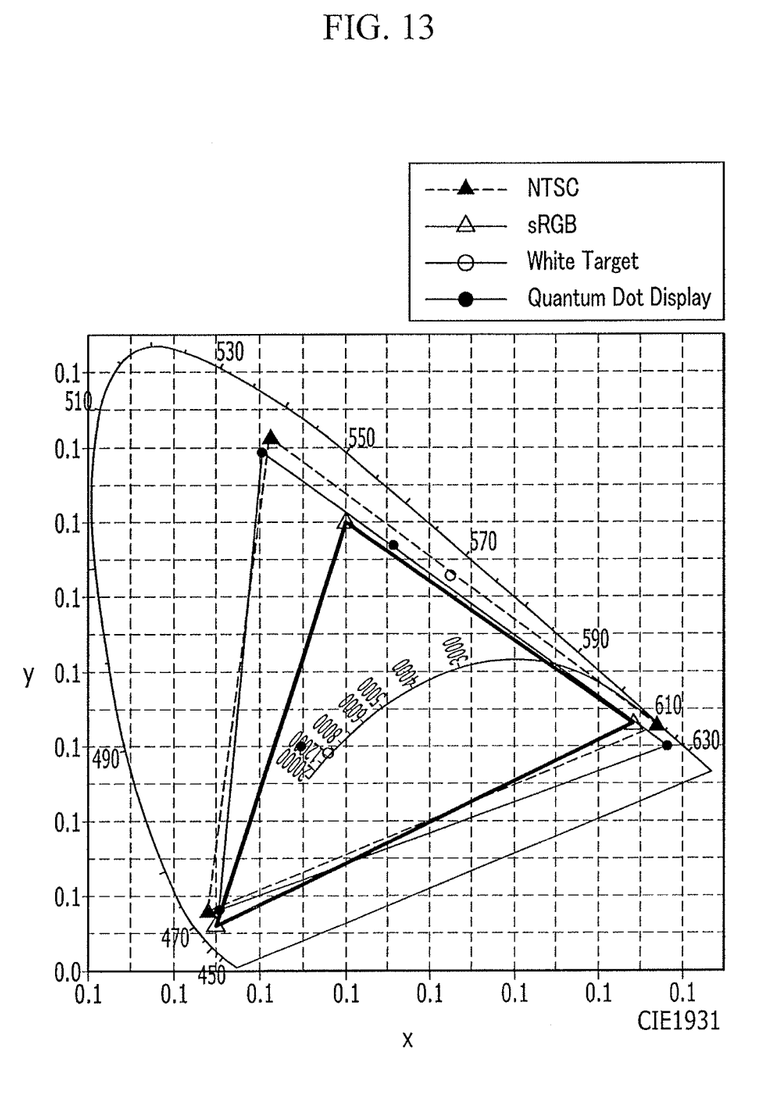
FIG. 13 illustrates a color space for explaining a color reproducibility of a liquid crystal display device according to an exemplary embodiment.

FIG. 13 illustrates a color space for explaining color reproducibility of a liquid crystal display device according to an exemplary embodiment. Referring to FIG. 13, a color space of the liquid crystal display device (quantum dot display) according to an embodiment may be matched with the color space of sRGB (standard red-green-blue) by 99%, and the liquid crystal display device using quantum dots may display almost all colors which may be displayed by the sRGB.

The sRGB may display colors which may be displayed at 72% of the National Television System Committee (NTSC) standard. In contrast, the color space of the liquid crystal display device using the quantum dots may be matched with the color space of the NTSC standard by 99%, and the liquid crystal display device using quantum dots may display almost all colors which may be displayed by the NTSC standard.

The liquid crystal display device using quantum dots may further improve the color reproducibility as compared with the sRGB.

By way of summation and review, in the context of a light source for a liquid crystal display device, a light emitting diode (LED) does not include mercury, unlike a cold cathode fluorescent lamp, is environmentally friendly, may have color reproducibility of 104% compared with the NTSC standard, and may be able to represent colors that are closer to nature.

Techniques of improving color reproducibility by applying phosphors such as quantum dots to a backlight device have been developed. For example, a resin including quantum dots may fill a container disposed in a front surface of a light source, and may improve the luminance of light emitted from the light source by the quantum dots. The container filled with the quantum dots may be sealed to prevent deformation of the quantum dots caused by, for example, moisture, air, and impurity gas. The portion of the container to be sealed may be separated from the resin including the quantum dots to prevent the quantum dots from being damaged, for example, by heat generated when the sealing is performed, and an unnecessary protrusion may be formed in the container filled with the quantum dots. The protrusion may limit a reduction of the width of a bezel of the liquid crystal display device.

According to the exemplary embodiments, provided is a liquid crystal display device, and a manufacturing method thereof, that may minimize the width of a bezel of a liquid crystal display device and improve color reproducibility.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of manufacturing a liquid crystal display device including a display panel, a light source to supply light to the display panel, and quantum dots unit on a light-emitting surface of the light source, the method comprising:
disposing a tube member having one open end;
injecting a resin including quantum dots into the tube member through the open end; and
sealing the tube member by locally heating the open end using a heating device, wherein:
locally heating the open end includes locally cooling a region of the tube member using a cooling device, and
when the open end is locally heated using the heating device, the region of the tube member is locally cooled using the cooling device.

2. The method as claimed in claim 1, wherein the open end is a sealing neck having an external diameter that is smaller than an external diameter of a remaining portion of the tube member.

3. The method as claimed in claim 1, wherein injecting the resin including quantum dots into the tube member through the open end includes inserting an injection needle for injecting the resin through the open end and injecting the resin into the tube member through the injection needle.

4. The method as claimed in claim 3, wherein the open end has an internal diameter that is larger than an external diameter of the injection needle.

5. The method as claimed in claim 3, wherein the resin fills the tube member up to a beginning of the open end.

6. The method as claimed in claim 5, further comprising removing the injection needle after the resin fills the tube member to the beginning of the open end.

7. The method as claimed in claim 1, further comprising adjusting an inside of the tube member into which the resin is injected to a vacuum condition.

8. The method as claimed in claim 1, further comprising purging an inside of the tube member into which the resin is injected using an inert gas.

9. The method as claimed in claim 1, further comprising curing the resin after the inside of the tube member into which the resin is injected is adjusted to a vacuum condition or purged with an inert gas.

10. The method as claimed in claim 9, comprising curing the resin by one or more of ultraviolet curing or heat curing.

11. The method as claimed in claim 1, wherein the locally cooled region is a beginning of the open end of the tube member, which is filled with the resin, the locally cooled region being between the open end and a resin-filled portion of the tube member.

12. The method as claimed in claim 1, wherein disposing the tube member having one open end includes forming the tube member to have a cross-section of which shape is one of a rectangle, a square, an oval, or a circle.

13. The method as claimed in claim 12, wherein disposing the tube member having one open end includes forming the open end to have a cross-section of which shape is one of a rectangle, a square, an oval, or a circle.

14. The method as claimed in claim 1, wherein the cooling device includes a cooling wire wound around the tube member.

15. The method as claimed in claim 1, wherein the cooling device is an air cooling device.

16. The method as claimed in claim 1, wherein the cooling device is a water cooling device.

* * * * *